(12) United States Patent
Takeichi

(10) Patent No.: US 7,380,762 B2
(45) Date of Patent: Jun. 3, 2008

(54) CONTAINER HOLDER OF A VEHICLE

(75) Inventor: Chikashi Takeichi, Nishikamo-gun (JP)

(73) Assignee: Kojima Press Industry Co., Ltd., Toyota-shi (JP)

( * ) Notice: Subject to any disclaimer, the term of this patent is extended or adjusted under 35 U.S.C. 154(b) by 44 days.

(21) Appl. No.: 11/146,125

(22) Filed: Jun. 7, 2005

(65) Prior Publication Data

US 2005/0274862 A1 Dec. 15, 2005

(30) Foreign Application Priority Data

Jun. 11, 2004 (JP) ............................. 2004-173825
May 13, 2005 (JP) ............................. 2005-140885

(51) Int. Cl.
*A47K 1/08* (2006.01)
(52) U.S. Cl. ................. 248/311.2; 248/309.1
(58) Field of Classification Search ............ 248/309.1, 248/311.2, 312, 312.1, 149, 154; 206/427, 206/430, 545, 477, 560, 565, 722; 297/188.14; 224/926, 282
See application file for complete search history.

(56) References Cited

U.S. PATENT DOCUMENTS 6,749,167 B2* 6/2004 Kaupp et al. ............ 248/311.2
6,817,584 B2* 11/2004 Ogura ...................... 248/311.2
6,854,699 B2* 2/2005 Nishizawa ............... 248/311.2
6,969,035 B2* 11/2005 Leopold et al. .......... 248/311.2
2005/0224676 A1* 10/2005 Stavermann ............. 248/311.2

FOREIGN PATENT DOCUMENTS

JP 10-086734 4/1998
JP 2002-104050 4/2002

* cited by examiner

*Primary Examiner*—Brian Glessner
*Assistant Examiner*—Todd M. Epps
(74) *Attorney, Agent, or Firm*—Kenyon & Kenyon LLP (57) ABSTRACT

A container holder of a vehicle includes a holder body and a support assembly. The holder body includes a container housing space. The support assembly includes a first support and a second support. The first support is rotatably coupled to the holder body and is adapted to support a container at a first position of a side wall of the container when the container is positioned in the container housing space. The second support is rotatably coupled to the first support and is adapted to support the container at a second position, different in position from the first position in a vertical direction, of the side wall of the container when the container is positioned in the container housing space.

7 Claims, 6 Drawing Sheets

CONTAINER HOLDER OF A VEHICLE

BACKGROUND OF THE INVENTION

1. Field of the Invention

The present invention relates to a container holder of a vehicle. The container may, for example, be a cup, a bottle, a can, a portable telephone, an umbrella, etc.

2. Description of Related Art

In a case where a container holder is a cup holder, following cup holders of a vehicle are known:
(i) A first cup holder disclosed in Japanese Patent Publication 2002-104050 includes a support constructed of a single support, for holding a cup. The support is rotatably biased from a receding position where the support recedes to a side wall of a holder body to a forwarding position where the support is rotated to protrude into a cup housing space defined by the side wall of the holder body.
(ii) A second cup holder disclosed in Japanese Patent Publication HEI 10-86734 has a support having opposite ends. When a cup is inserted to a cup housing space and one end of the support is pushed by weight of the cup, the other end of the support protrudes into the cup housing space to hold the cup.

Figure 12:
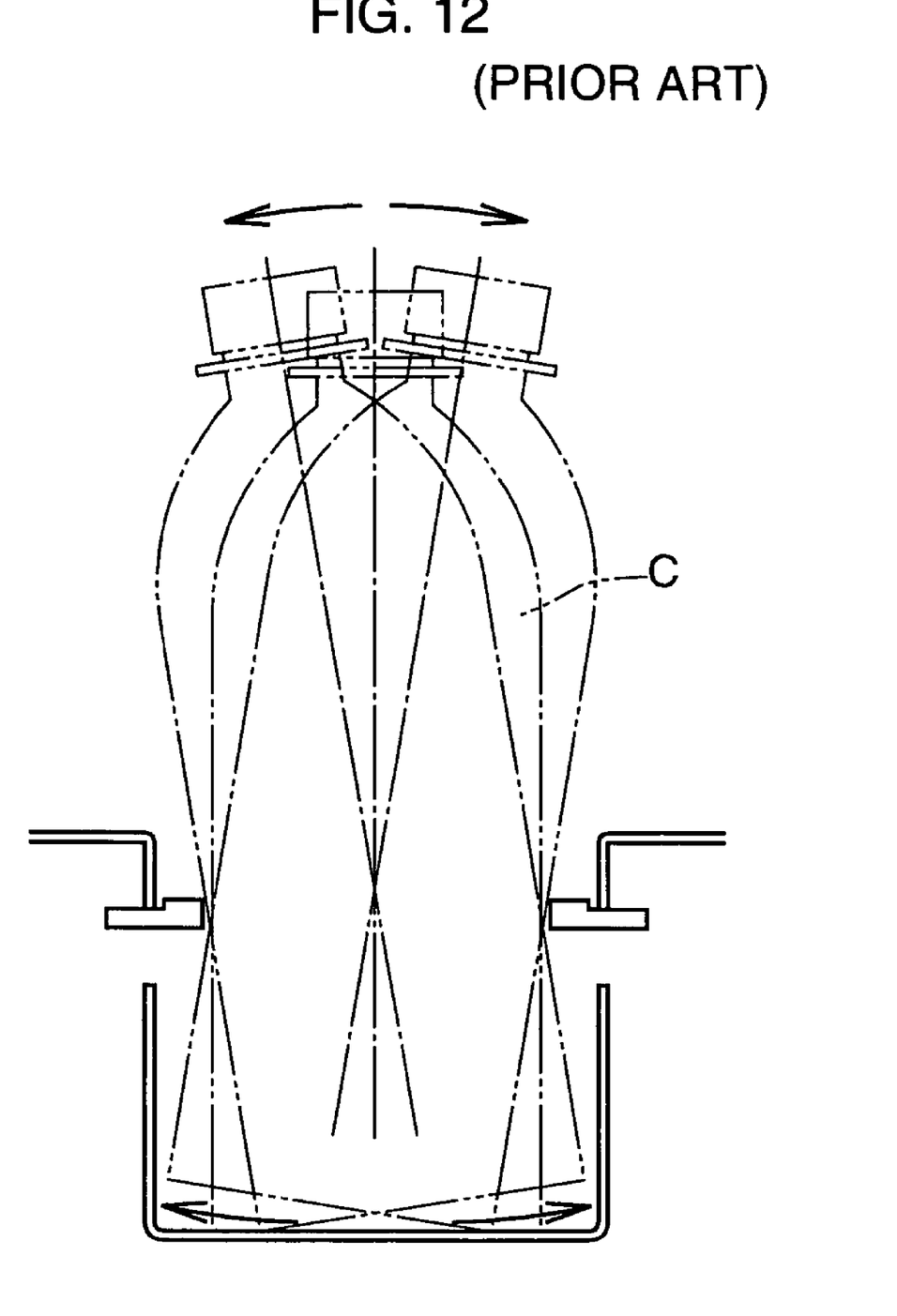
FIG. 12 is a cross-sectional view of a conventional container holder of a vehicle and a container inserted into the conventional container holder, illustrating movement of the container when a lateral force acts on the container.

With the above-described cup holders, there are the following problems:
With the cup holder of above (i), as illustrated in FIG. 12, since the support is designed so as to support the cup at a position of the cup holder as high as possible, when a large lateral force acts on the cup, the cup C is inclined because the cup is not supported at its bottom, so that there is a risk that liquid in the cup will spill out.
With the cup holder of above (ii), when there is no or little liquid in the cup, the support does not operate and the cup is not supported by the support.

SUMMARY OF THE INVENTION

A first, main object of the present invention is to provide a container holder of a vehicle capable of preventing a container from being inclined in a container housing space of the container holder when a lateral force acts on the container.

A second, subsidiary object of the present invention is to provide a container holder of a vehicle capable of supporting a container irrespective of a weight of the liquid contained in the container.

The above objects can be attained by a container holder of a vehicle according to the present invention:
(1) The container holder of a vehicle according to the present invention includes a holder body including a container housing space, and a support assembly including a first support and a second support. The first support is rotatably coupled to the holder body and supports a container at a first position of a side wall of the container when the container is positioned in the container housing space. The second support is rotatably coupled to the first support and supports the container at a second position, different in position from the first position in a vertical direction, of the side wall of the container when the container is positioned in the container housing space.
(2) The container holder may further include a first spring and a second spring. The first spring biases the support assembly relative to the holder body in a rotational direction. The second spring biases the first support and the second support relative to each other in a rotational direction so as to decrease an angle defined between a surface of the first support facing the container housing space and a surface of the second support facing the container housing space.
(3) A support among the first support and the second support having an upper position among the first position and the second position has a stopper formed therein. The stopper is engageable with the holder body for restricting rotation of the support after the stopper engages with the holder body.
(4) A longitudinal hole having a longitudinal axis extending in a direction perpendicular to the vertical direction is formed in the holder body, and a pin capable of being inserted in the longitudinal hole so as to be slidable relative to the longitudinal hole is formed in the first support.

The pin is movable in the longitudinal hole in a longitudinal direction of the longitudinal hole whereby the support assembly is movable relative to the holder body between a forward position where the support assembly is closest to a center of the container housing space and a receding position where the support assembly is farthest from the center of the container housing space.

The stopper is capable of engaging with the holder body when the support assembly is located at the receding position, and the stopper is capable of disengaging with the holder body when the support assembly is located at the forward position.
(5) A first cam portion is formed in the support assembly. The first cam portion is brought into contact with the holder body thereby causing the support assembly to move from the receding position to the forward position, when removing the container from the container housing space.
(6) A second cam portion is formed in the support assembly. The second cam portion is brought into contact with the holder body thereby causing the support assembly to move from the receding position to the forward position, when inserting the container into the container housing space.
(7) A first rotational axis about which the first support is rotatable and a second rotational axis about which the second support is rotatable are offset in position from each other in a direction perpendicular to the first rotational axis and the second rotational axis.

With the container holder of a vehicle according to item (1) above, since the container holder includes the first support supporting the container at a first position of the side surface of the container and the second support supporting the container at a second position, different in position from the first position in a vertical direction, of the side wall of the container, that is, since the container is supported at two positions spaced from each other in the vertical direction, even if a lateral force acts on the container, the container is prevented from being inclined in the container housing space.

Further, since the first support and the second support support the container at the side wall of the container, the first and the second support can support the container irrespective of a weight of liquid contained in the container.

With the container holder of a vehicle according to item (2) above, since the container holder includes the second spring, when one of the first support and the second support is rotated by being pushed by a container when the container is inserted, the other of the first support and the second support can be rotated relative to the holder body together with the one of the first support and the second support.

With the container holder of a vehicle according to item (3) above, since a support among the first support and the second support having an upper position among the first position and the second position has a stopper, the support formed with the stopper is not moved and rotated more than a position where the support engages with the holder body, even in a case where the container is heavy and a large lateral force acts on the container. As a result, the container is prevented from inclining more than the conventional container having no stopper.

With the container holder of a vehicle according to item (4) above, since the stopper is capable of engaging with the holder body when the support assembly is located at the receding position and the stopper is capable of disengaging with the holder body when the support assembly is located at the forward position, by biasing the support assembly to the forward position when the container housing space does not have a container inserted therein, the support formed with the stopper is prevented from being protruded in the container housing space when the container housing space is not inserted with a container. As a result, a container can be smoothly inserted into the container housing space without colliding with the support formed with the stopper.

With the container holder of a vehicle according to item (5) above, since the first cam portion is formed in the support assembly, the first cam portion can cause the support assembly to be located at the forward position, when the container housing space does not have a container inserted therein.

With the container holder of a vehicle according to item (6) above, since the second cam portion is formed in the support assembly, when a container having a large diameter is inserted into the container housing space, the second cam portion is brought into contact with the holder body thereby causing the support assembly to move from the receding position to the forward position. Due to the movement of the support assembly to the forward position, the stopper becomes able to disengage with the holder body, and the support formed with the stopper is allowed to rotate so that the support formed with the stopper is prevented from continuing to protrude into the container housing space. As a result, when inserting the container having a large diameter, a side wall of the container is unlikely to be strongly pushed to be deformed by the support.

With the container holder of a vehicle according to item (7) above, since the first rotational axis of the first support and the second rotational axis of the second support are offset in position from each other in a direction perpendicular to the first rotational axis and the second rotational axis, the first support and the second support can support the container at the most appropriate positions which can be selected according to the configuration of the container.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawing, in which.

DETAILED DESCRIPTION OF THE PREFERRED EMBODIMENTS

A container to be held by a holder of a vehicle according to an embodiment of the present invention includes, for example, a cup, a bottle, a can, an umbrella, a portable telephone, and a small-sized parcel, and the like, or any object or portion of an object able to fit in the holder. A container shown in FIGS. is a cup, and therefore a container holder of a vehicle shown is a cup holder of a vehicle, but the container is not limited to a cup and the container holder of a vehicle is not limited to a cup holder of a vehicle.

Figure 1:
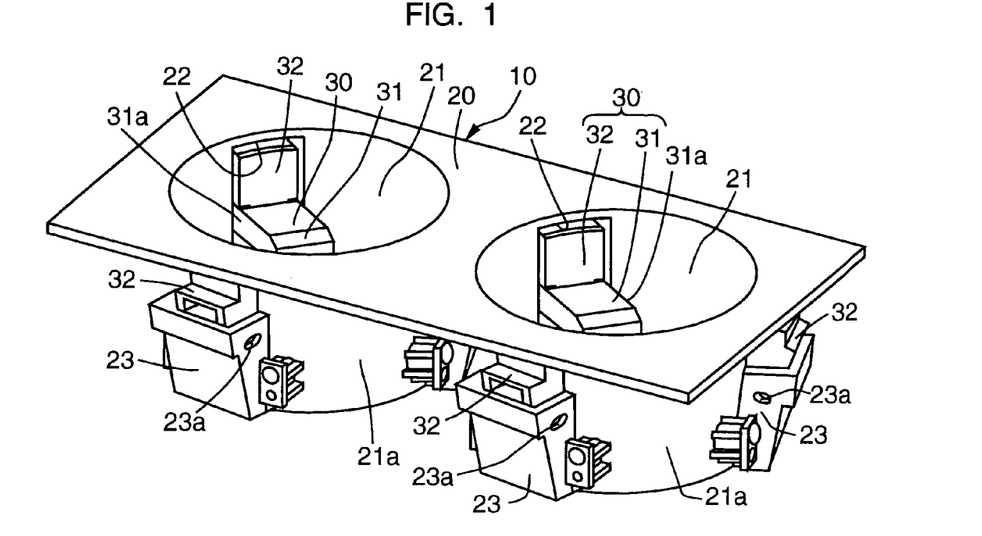
FIG. 1 is a perspective view of a container holder of a vehicle according to an embodiment of the present invention.
Figure 2:
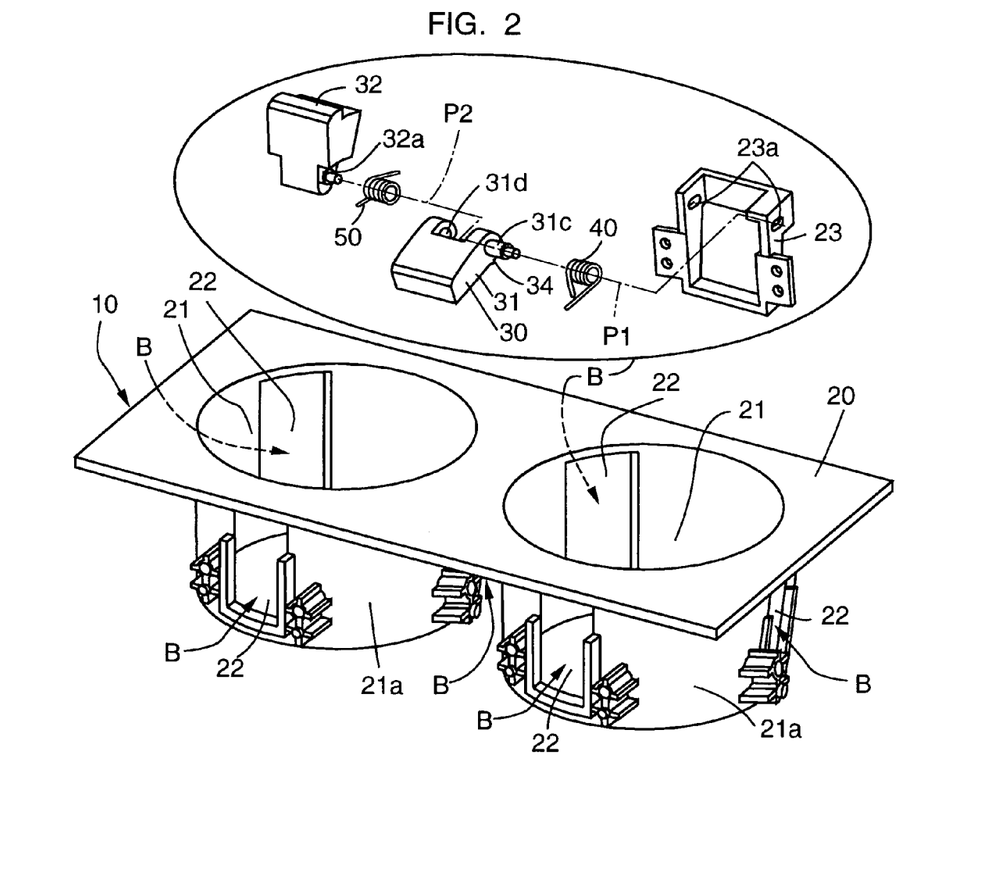
FIG. 2 is a perspective view of the container holder of a vehicle according to the embodiment of the present invention which includes (a) a holder body having two side walls each defining a container housing space therein and six holes formed in the side walls, and (b) support assemblies B each disposed in each of the six holes formed in the side walls of the holder body.

As illustrated in FIG. 2, a container holder 10 of a vehicle according to an embodiment of the present invention includes a holder body 20, a support assembly 30, a first spring 40 and a second spring 50.

The holder body 20 is made from, for example, synthetic resin. The holder body 20 is coupled to an interior member of the vehicle. The holder member 20 may be integrally coupled to the interior member, or may be made separately from the interior member and fixed to the interior member.

The holder member 20 includes at least one side wall 21a each defining a container housing space therein 21. In the side wall 21a, at least one hole 22 extends in an up-and-down direction (a vertical direction, i.e. a container insertion and taking-out direction). A plurality of holes 22 may be formed in the side wall 21a. In the embodiment shown, two side walls 21a are provided, and in each said wall 21a, three holes 22 are formed. In a case where a plurality of holes 22 are provided in the side wall 21a, lower edges of the plurality of holes 22 are located at the same height from a bottom wall of the container housing space in the vertical direction.

The holder body 20 includes a casing 23 which is disposed in the side wall 21a. The same number of casings 23 as the number of the holes 22 are provided. Each casing 23 includes (a) a pair of longitudinal holes 23a each having a longitudinal axis which extends in a direction substantially perpendicular to the vertical direction (up-and-down direction) and (b) a stopper engaging portion 23b with which a stopper 32b (FIG. 6) of the support assembly 30 is engageable.

Figure 10:
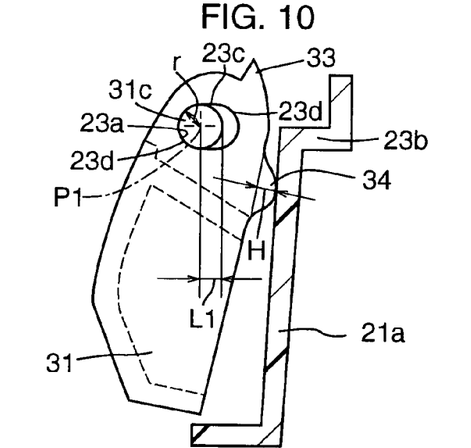
FIG. 10 is an enlarged, side elevational view of the first support of the container holder of a vehicle according to the embodiment of the present invention in a state where a second cam portion contacts a holder body.

As illustrated in FIG. 10, the longitudinal hole 23a includes a side-parallel portion 23c (i.e., a central or approximately central portion of hole 23a where its sides are parallel or approximately parallel) having a length of L1 and a semi-circle portion 23d located at each of opposite ends of the side-parallel portion 23c. A pin 31c of the support assembly 30 is inserted in the side-parallel portion 23c.

As illustrated in FIG. 2, the support assembly 30 includes a first support 31 and a second support 32. The first support 31 is rotatably coupled to the holder body 20 and is adapted to support a container C (see FIGS. 3-8) at a first position of a side wall of the container C when the container C is positioned in the container housing space 21. The second support 32 is rotatably coupled to the first support 31 and is adapted to support the container C at a second portion, different in position from the first portion in the vertical direction, of the side wall of the container C when the container C is positioned in the container housing space 21.

In the embodiment shown, the second position is positioned above the first position, but the second position may be positioned below the first position.

Figure 3:
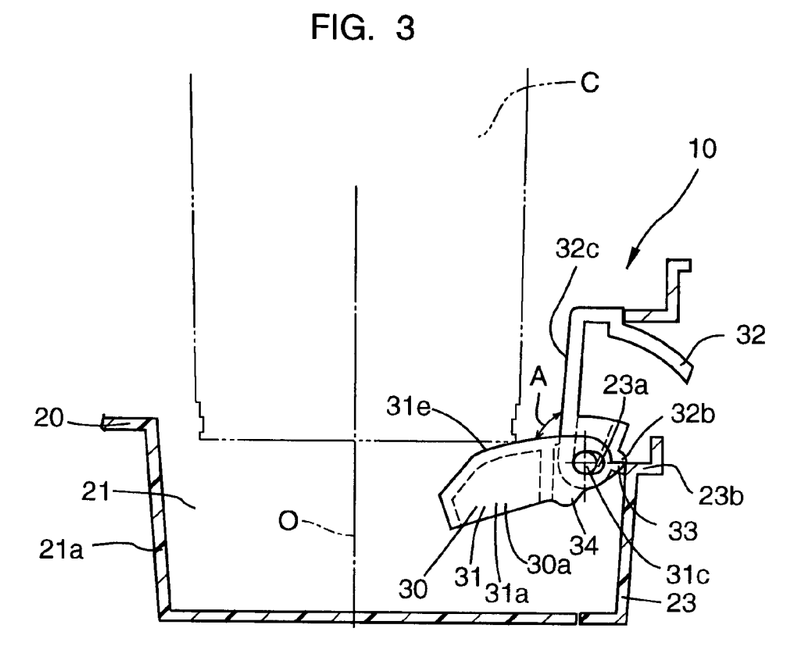
FIG. 3 is a cross-sectional view of the container holder of a vehicle according to the embodiment of the present invention and a container in a first state where the container is being inserted into the container housing space of the container holder.

The first support 31 is made from, for example, synthetic resin. The same number of first supports 31 are provided as the number of the holes 22 formed in the holder body 20. The first support 31 is rotatable relative to the holder body 20 in an up-and-down direction (vertical direction). The first support 31 is rotatable between a projecting position 31a (a position shown in FIG. 3) where the first support 31 protrudes into the container housing space 21 and a pushed-down position 31b (a position shown in FIG. 8) where the first support 31 is pushed down from the projecting position 31a. As illustrated in FIG. 3, when the first support 31 is at a projecting position 31a, the first support 31 extends in a direction substantially perpendicular to the up-and-down direction (vertical direction). The first support 31 includes a pin 31c.

The pin 31c is formed in one end portion of the first support 31. The pin 31c is rotatable in the longitudinal hole 23a and is movable in the longitudinal hole 23a in the longitudinal direction of the longitudinal hole 23a. The support assembly 30 is movable relative to the holder body 20 between (a) a forward position where the pin 31c is located in the longitudinal hole 23a at a first end located closer to a center O of the container housing space 21 and (b) a receding position where the pin 31c is located in the longitudinal hole 23a at a second, opposite end located farther from a center O of the container housing space 21.

Figure 11:
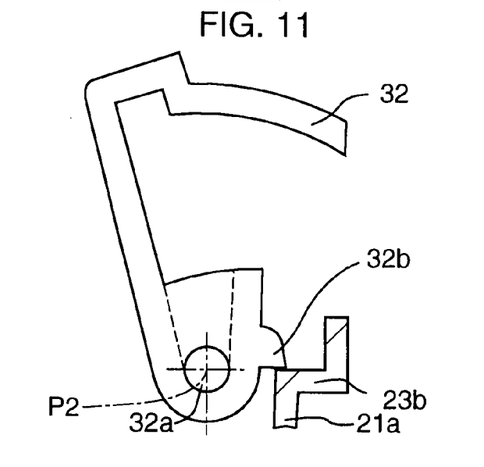
FIG. 11 is an enlarged, side elevational view of a second support of the container holder of a vehicle according to the embodiment of the present invention.

The second support 32 is made from, for example, synthetic resin. The same number of second supports 32 are provided as the number of the first supports 31. The second support 32 is rotatable relative to the first support 31 in an up-and-down-direction (vertical direction). As illustrated in FIG. 11, the second support 32 includes a rotational shaft 32a and the stopper 32b.

The rotational shaft 32a is located at one end portion of the second support 32. As illustrated in FIG. 2, the rotational shaft 32a is inserted into a concave portion 32d formed in the first support 31. The cross section of the concave portion 32d is circular. The rotational axis 32a is able to rotate only in the concave portion 32d. A rotational axis P2 of the second support 32 and a rotational axis P1 of the first support 31 may coincide with each other or may be offset from each other in a direction perpendicular to the rotational axis P1 and the rotational axis P2.

As illustrated in FIG. 11, the stopper 32b is formed at the end portion 32a of the second support 32 where the rotational shaft 32a is provided. The stopper 32b may be integrally formed with the second support 32 or may be made separately from the second support 32 and be fixed to second support 32. The stopper 32b is capable of engaging with the stopper engaging portion 23b of the casing 23 of the holder body 20 when the support assembly 30 is located at the receding position 32b, and the stopper 32b is capable of disengaging with the stopper engaging portion 23b of the casing 23 of the holder body 20 when the support assembly 30 is located at the forward position 30a. An engaging length of the stopper 32b with the stopper engaging portion 23b when the support assembly 30 is located at the receding position 32b is smaller than a length L1 of the side-parallel portion 23c of the longitudinal hole 23a. When the stopper 32b is brought into contact with the stopper engaging portion 23b, the second support 32 is prevented from rotating in a direction where the second support 32 goes outside of container housing space 21.

Figure 8:
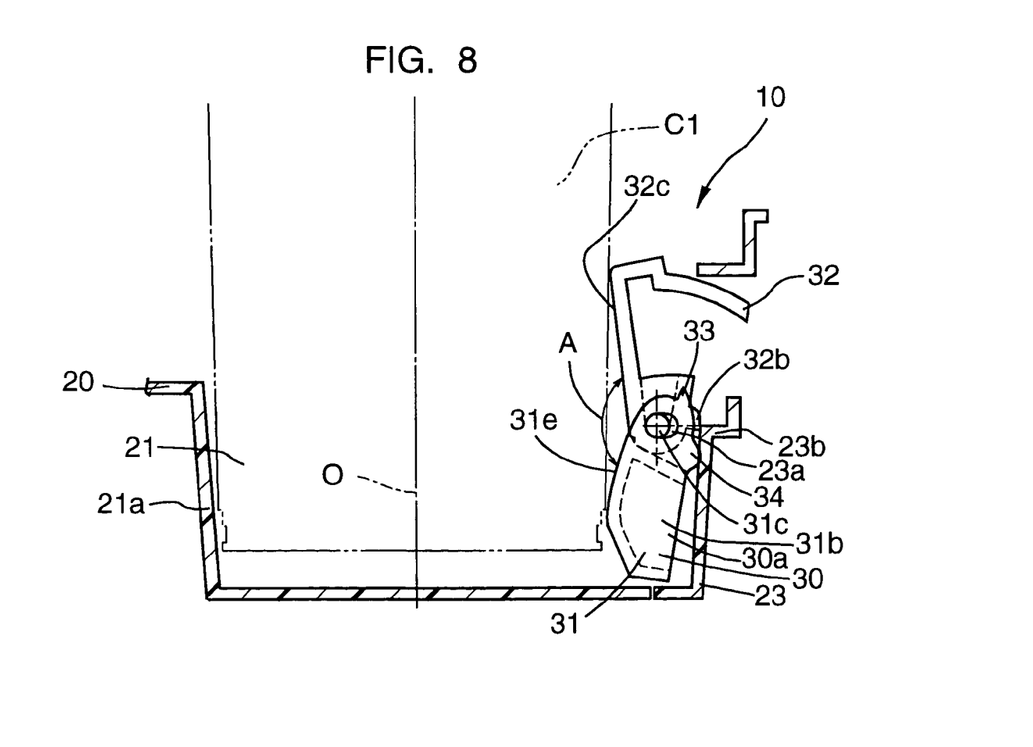
FIG. 8 is a cross-sectional view of the container holder of a vehicle according to the embodiment of the present invention and a container having a large diameter where the container has been completely inserted into the container housing space of the container holder.
Figure 9:
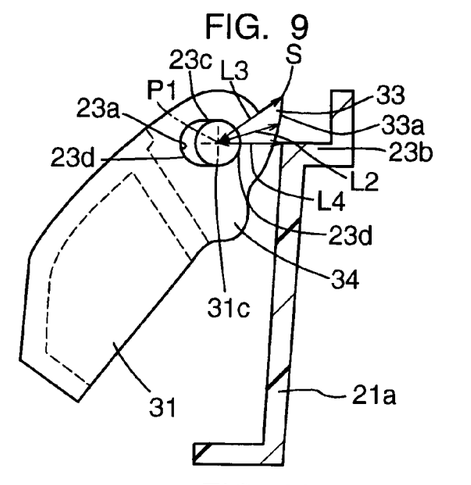
FIG. 9 is an enlarged, side elevational view of a first support of the container holder of a vehicle according to the embodiment of the present invention.

As illustrated in FIG. 9, the support assembly 30 includes a first cam portion 33 and a second cam portion 34 formed therein. When taking out the container C from the container housing space 21, the first cam portion 33 is brought into contact with the holder body 20 thereby causing the support assembly 30 to move from the receding position 32b to the forward position 32a. When inserting the container C1 (see FIG. 8) having a large diameter (a larger diameter than a usual cup) into the container housing space 21, the second cam portion 34 is brought into contact with the holder body 20 thereby causing the support assembly 30 to move from the receding position 30b to the forward position 30a.

The first cam portion 33 is formed in the first support 31. The first cam portion 33 may be integrally formed with the first support 31 or may be made separately from the first support 31 and be fixed to the first support 31. The first cam portion 33 is formed in the end portion of the first support 31 where the pin 31c is provided. When taking out the container C from the container housing space 21 (i.e., when the first support 31 is rotated from the pushed-down position 31b to the projecting position 31a), the first cam portion 33 is brought into contact with the holder body 20 thereby causing the support assembly 30 to move along the longitudinal hole 23a from the receding position 30b to the forward position 30a. The first cam portion 33 is provided with a cam surface 33a. As illustrated in FIG. 9, a distance L2 between a cam surface point on the cam surface 33a and the rotational axis P1 of the first support 31 gradually increases, when the cam surface point on the cam surface 33a approaches a tip end S of the cam surface 33a. A distance L3 between the rotational axis P1 of the first support 31 and the tip end S of the cam surface 33a is substantially equal to a distance L4 between the rotational axis P1 of the first support 31 and the side wall 21a of the container housing space 21, when the support assembly 30 is positioned at the forward position 30a.

The second cam portion 34 is formed in the first support 31. The second cam portion 34 may be integrally formed with the first support 31 or may be made separately from the first support 31 and be fixed to the first support 31. The second cam portion 34 is formed in a lower surface of the first support 31 when the first support 31 is positioned at the projecting position 31a. As illustrated in FIG. 8, when a container C1 having a large diameter is inserted into the container housing space and the first support 31 is pushed down more than a predetermined angle by the container C1 having a large diameter, the second cam portion 34 is brought into contact with the holder body 20, thereby causing the support assembly 30 to move from the receding position 30b to the forward position 30a. As illustrated in FIG. 10, a height H of the second cam portion 34 is equal to or slightly smaller than the length L1 of the side-parallel portion 23c of the longitudinal hole 23a.

As illustrated in FIG. 2, the first spring 40 is a torsion spring. One end of the first spring 40 contacts the holder body 20 and the other end of the first spring 40 contacts the first support 31 or the second support 32. When one end of the first spring 40 contacts the holder body 20 and the other end of the first spring 40 contacts the second support 32, a spring force of the first spring 40 is selected to be smaller than a spring force of the second spring 50. The first spring 40 biases the support assembly 30 relative to the holder body 20 in a direction where the first support 31 rotates from the pushed-down position 31b to the projecting position 31a.

The second spring 50 is a torsion spring. One end of the second spring 50 contacts the first support 31 and the other end of the second spring 50 contacts the second support 32. The second spring 50 biases the first support 31 and the second support 32 relative to each other in a rotational direction so as to decrease an angle A (see FIGS. 3-8) defined between a surface 31e of the first support 31 facing the container housing space 21 and a surface 32c of the second support 32 facing the container housing space 21. The angle A is maintained so as not to be smaller than a predetermined angle by contact of one portion of the second support 32 with one portion of the first support 31. The predetermined angle is, for example, 90° or an angle in a range of 70°-110°.

Next, operation of the container holder of a vehicle according to the present invention will be explained.

(a) In a First State where a Container C is Not Yet Held In the Container Housing Space 21:

The support assembly 30 is positioned at the forward position 30a. As illustrated in FIG. 3, the first support 31 is positioned at the projecting position 31a. The second support 32 takes a posture where the second support 32 extends upwardly. Preferably, the second support 32 is housed in the side wall 21a of the container housing space 21. The stopper 32b disengages with the stopper engaging portion 23b. The first cam portion 33 contacts the holder body 20.

Figure 4:
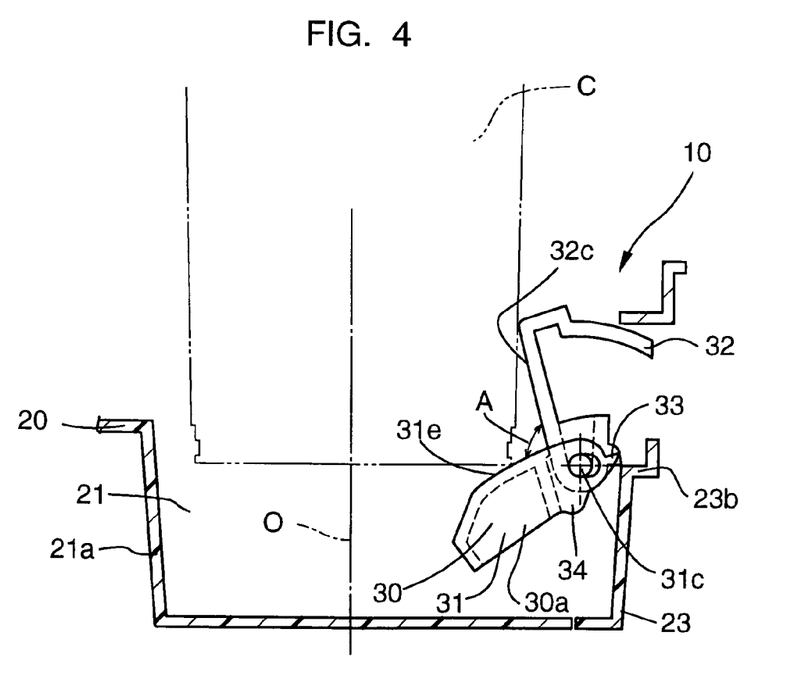
FIG. 4 is a cross-sectional view of the container holder of a vehicle according to the embodiment of the present invention and the container in a second state where the container has been inserted further than in the first state of FIG. 3 and is still being inserted into the container housing space of the container holder.

(b) In a Second State where the Container C is being Inserted into the Container Housing Space 21:

As illustrated in FIG. 4, when inserting the container C into the container housing space 21, the first support 31 positioned at the projecting position 31a is pushed down by the container C. The second support 32 is rotated together with the first support 31 relative to the holder body 20 maintaining the angle A constant by the biasing force of the second spring 50.

Figure 5:
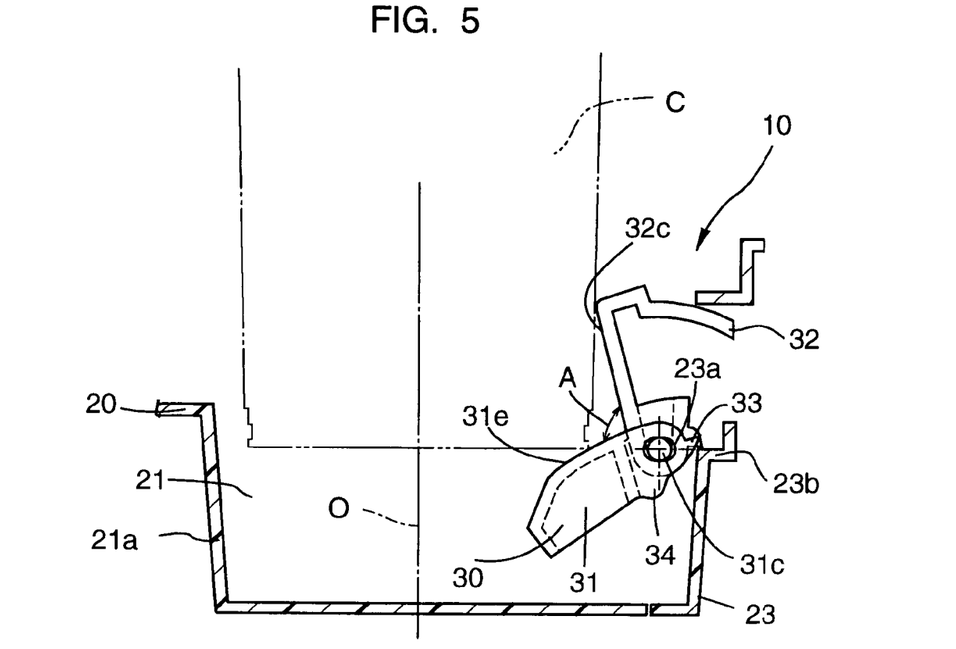
FIG. 5 is a cross-sectional view of the container holder of a vehicle according to the embodiment of the present invention and the container in a third state where the container has been inserted further than in the second state of FIG. 4 and is still being inserted into the container housing space of the container holder.

After inserting the container C into the container housing space 21 until the second support 32 begins to contact a side surface of the container C, when further inserting the container C into the container housing space 21, the first support 31 begins to rotate relative to the second support 32 so that the angle A increases. Though the first support 31 and the second support 32 are biased by the second spring 50 so as to decrease the angle A, the first support 31 and the second support 32 cannot rotate relative to each other, because relative rotation is restricted by the container C. As a result, as illustrated in FIG. 5, the pin 31c moves in the longitudinal hole 23a by a reaction force of the second spring 50, thereby moving the support assembly 30 from the forward position 30a to the receding position 30b.

Figure 6:
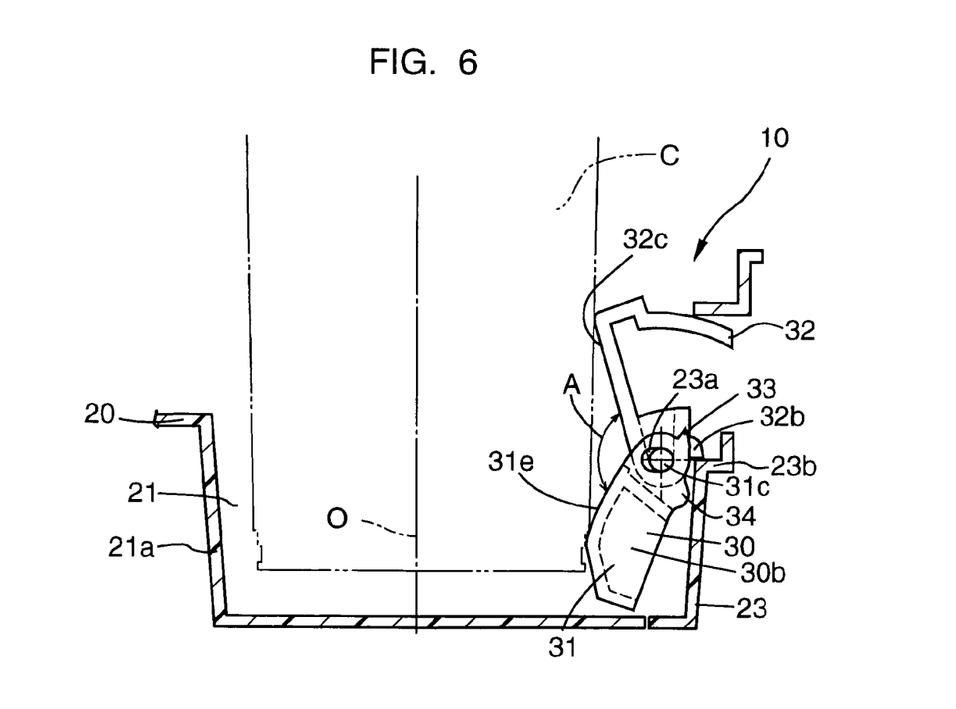
FIG. 6 is a cross-sectional view of the container holder of a vehicle according to the embodiment of the present invention and the container in a fourth state where the container has been inserted further than in the third state of FIG. 4 and has been completely inserted into the container housing space of the container holder.

(c) In a State where the Container C Has Been Completely Inserted into the Container Housing Space 21:

As illustrated in FIG. 6, the support assembly 30 is positioned at the receding position 30b. The first support 31 contacts a first, bottom portion of the side surface of the container C and supports the container C. The second support 32 contacts a second portion above the first portion, of the side surface of the container C and supports the container C. The stopper 32b is engageable with the stopper engaging portion 23b of the holder body 20. Since the stopper 32b is engageable with the holder body 20, even if a lateral force acts on the container C and the container C is likely to incline in the container housing space 21, the container can only incline up to an angle at which the stopper 32b engages the stopper engaging portion 23b and is prevented from falling in the container housing space 21. The first cam portion 33 is spaced apart from the holder body 20.

Figure 7:
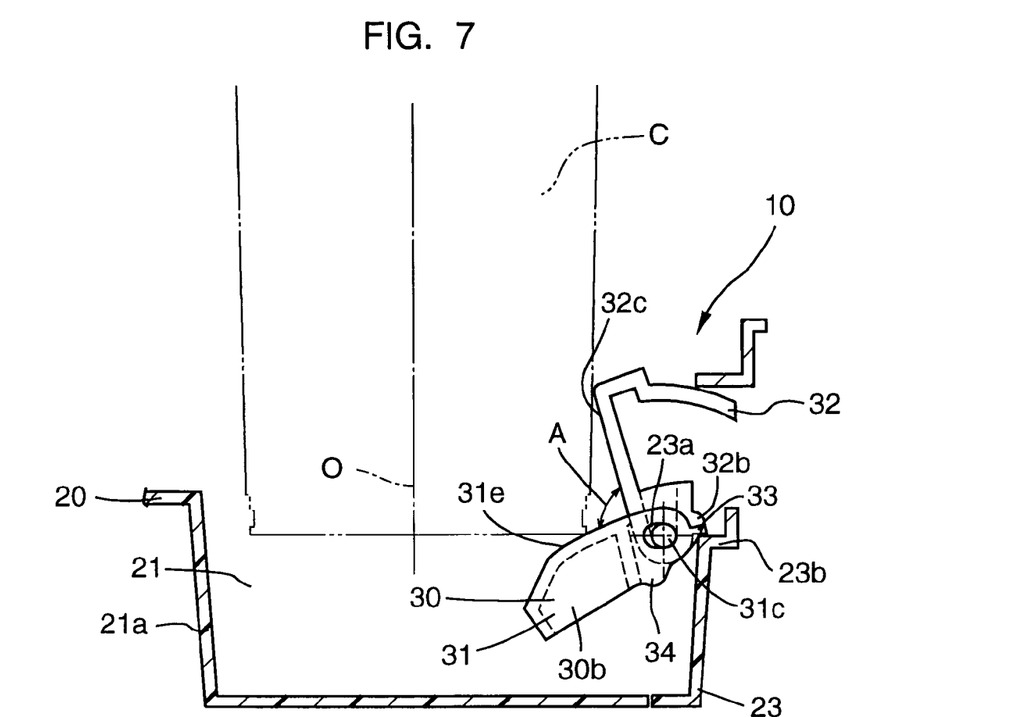
FIG. 7 is a cross-sectional view of the container holder of a vehicle according to the embodiment of the present invention and the container in a fifth state where the container is being taken out from the container housing space of the container holder.

(d) When the Container C is Taken Out from the Container Housing Space 21:

As illustrated in FIG. 7, when the container C is being moved upwardly in the container housing space 21, the first support 31 rotates toward the projecting position 31a, and at the same time, the first cam portion 33 begins to contact the holder body 20, so that the support assembly 30 moves from the receding position 30b toward the forward position 30a.

Since the support assembly 30 is moved toward the forward position 30a, the stopper 32b is disengageable with the stopper engaging portion 23b. As a result, the support assembly 30 can return to the state (the above state (a)) where no container C is housed in the container housing space 21.

(e) When Inserting a Container C1 Having Such a Large Diameter that the Container C1 can be Directly Supported by the Side Surface 21a of the Container Housing Space 21, into the Container Housing Space 21:

When inserting the container C1 having a large diameter into the container housing space 21, the first support 31 positioned at the projecting position 31a is pushed down by the container C1. The second support 32 rotates relative to the holder body 20 together with the first support 31, maintaining the angle A constant by the biasing force of the second spring 50.

After inserting the container C1 into the container housing space 21 until the second support 32 begins to contact a side surface of the container C1, when further inserting the container C1 into the container housing space 21, the support assembly 30 is moved from the forward position 30a to the receding position 30b by the biasing force of the second spring 50. Since the support assembly approaches the receding position 30b, the stopper 32b is engageable with the stopper engaging portion 23b of the holder body 20.

When further inserting the container C1 into the container housing space 21, as illustrated in FIG. 8, the first support 31 is pushed down by the container C1 and the second cam portion 34 contacts the holder body 20, whereby the support assembly 30 moves from the receding position 30b toward the forward position 30a.

Since the support assembly 30 is moved toward the forward position 30a, the stopper 32b is disengageable with the stopper engaging portion 23b. As a result, when inserting the container C1, the stopper 32b does not engage with the stopper engaging portion 23b whereby the container C1 having a large diameter can be inserted into the container housing space 21.

Since the container C1 has a large diameter, there is substantially no or little gap between the side surface of the inserted container C1 and the side wall 21a of the container housing space 21, so that the container C1 can be supported directly by the side wall 21a of the container housing space 21 and the container C1 does not fall in the container housing space 21 even though the stopper 32b is disengageable with the stopper engaging portion 23b.

Technical advantages of the present invention are as follows:

With the container holder of a vehicle according to the present invention, since the support assembly 30 includes the first support 31 and the second support 32, even if a lateral force of the vehicle acts on the container C, the container C is prevented from being inclined in the container housing space 21. Further, since the first support 31 and the second support 32 support the container C at the side surface of the container C, the container C can be supported irrespective of a weight of the container C.

Further, since the container holder includes the second spring 50, when one of the first support 31 and the second support 32 is rotated by being pushed by a container C when the container C is inserted, the other of the first support 31 and the second support 32 can be rotated relative to the holder body 20 together with the one of the first support 31 and the second support 32.

Since the stopper 32b is engageable with the stopper engaging portion 23b, even if a lateral force acts on the container C, the container C inclines only to an angle where the stopper 32b engages the stopper engaging portion 23b, so that the container C does not fall.

Since the stopper 32b is engageable with the stopper engaging portion 23b of the holder body 20 when the support assembly 30 is located at the receding position 30b and the stopper 32b is disengageable with the holder body 20 when the support assembly 30 is located at the forward position 30a, by biasing the support assembly 30 to the forward position 30a when the container housing space 21 does not have a container C inserted therein, the support formed with the stopper (for example, the second support 32) is prevented from being protruded in the container housing space 21 when the container housing space 21 is not inserted with a container C. As a result, a container C can be smoothly inserted to the container housing space 21 without colliding with the support formed with the stopper (for example, the second support 32).

Since the first cam portion 33 is formed in the support assembly 30, the first cam portion 33 can cause the support assembly 30 to be positioned at the forward position 30a, when the container housing space 21 does not have a container C inserted therein.

Since the second cam portion 34 is formed in the support assembly 30, when a container C1 having a large diameter is inserted into the container housing space 21, the second cam portion 34 is brought into contact with the holder body 20 thereby causing the support assembly 30 to move from the receding position 30b to the forward position 30a. Due to the movement of the support assembly 30 to the forward position 30a, the stopper 32b becomes able to disengage with the holder body 20, and the support formed with the stopper 32b (for example, the second support 32) is allowed to rotate so that the support formed with the stopper 32b (for example, the second support 32) is prevented from continuing to protrude into the container housing space 21. As a result, when inserting the container C1 having a large diameter, a side wall of the container C1 is unlikely to be strongly pushed to be deformed by the support formed with the stopper 32b (for example, the second support 32).

In a first case where the first rotational axis P1 of the first support 31 is positioned above and the second rotational axis P2 of the second support 32, the container support point of the first support 31 can be raised in position, compared with a second case where the first rotational axis P1 of the first support 31 is positioned at the same position in the vertical direction as that of the second rotational axis P2 of the second support 32.

Since the first spring 40 and the second spring 50 are provided, the first support 31 can be positioned at the projecting position 30a when the container housing space 21 is not inserted with a container C. As a result, when inserting a container C into the container housing space 21, the first support 31 is reliably pushed down by the container C.

Since the first spring 40 and the second spring 50 are provided, a container C can be supported at two points by the first support 31 and the second support 32 by only inserting the container C into the container housing space 21.

Although the present invention has been described above with reference to specific exemplary embodiments, it will be appreciated by those skilled in the art that various modification and alterations can be made to the particular embodiments shown without materially departing from the novel teachings and advantages of the present invention. Accordingly, it is to be understood that all such modifications and alterations are included within the sprit and scope of the present invention as defined by the following claims.

What is claimed is:

1. A container holder of a vehicle for holding a container having a side wall, said container holder comprising:
   a holder body including a container housing space; and
   a support assembly including a first support and a second support, said first support and said second support supporting a container at the side wall of the container, when the container is positioned in the container housing space; said first support being rotatably coupled to said holder body and being adapted to support the container at a first position of the side wall of the container when the container is positioned in said container housing space, said second support being rotatably coupled to said first support so as to be rotatable relative to said first support in a vertical direction about a rotational axis of said second support and being adapted to support the container at a second position, different in position from said first position in the vertical direction, of the side wall of the container when the container is positioned in said container housing space, said first support extending in a horizontal or obliquely downward direction, said second support extending in an obliquely upward direction, in said first position, a lower portion of the container being positioned lower than said rotational axis of said second support, in said second position, a middle portion of the container being positioned higher than said rotational axis of said second support.

2. A container holder according to claim 1, further comprising:
a first spring biasing said support assembly relative to said holder body in a rotational direction; and
a second spring for biasing said first support and said second support relative to each other in a rotational direction so as to decrease an angle defined between a surface of said first support facing said container housing space and a surface of said second support facing said container housing space.

3. A container holder according to claim 1, wherein a support among said first support and said second support having an upper position among said first position and said second position has a stopper formed therein, engageable with said holder body for restricting rotation of said support after said stopper engages with said holder body.

4. A container holder according to claim 3, wherein a longitudinal hole having a longitudinal axis extending in a direction perpendicular to the vertical direction is formed in said holder body, and a pin capable of being inserted in said longitudinal hole so as to be slidable relative to said longitudinal hole is formed in said first support, said pin being movable in said longitudinal hole in a longitudinal direction of said longitudinal hole whereby said support assembly is movable relative to said holder body between a forward position where said support assembly is closest to a center of said container housing space and a receding position where said support assembly is farthest from the center of said container housing space,
said stopper is capable of engaging with said holder body when said support assembly is located at said receding position, and said stopper is capable of disengaging with said holder body when said support assembly is located at said forward position.

5. A container holder according to claim 4, wherein a first cam portion is formed in said support assembly, said first cam portion being brought into contact with said holder body thereby causing said support assembly to move from said receding position to said forward position, when taking out the container from said container housing space.

6. A container holder according to claim 4, wherein a second cam portion is formed in said support assembly, said second cam portion being brought into contact with said holder body thereby causing said support assembly to move from said receding position to said forward position, when inserting the container into said container housing space.

7. A container holder according to claim 1, wherein a first rotational axis about which said first support is rotatable and a second rotational axis about which said second support is rotatable are offset in position from each other in a direction perpendicular to said first rotational axis and said second rotational axis.

* * * * *